United States Patent [19]
Brissenden et al.

[11] Patent Number: 5,597,369
[45] Date of Patent: Jan. 28, 1997

[54] TRANSFER CASE WITH INTEGRATED VISCOUS COUPLING

[75] Inventors: James S. Brissenden, Baldwinsville; Robert J. Wilson, Warners; Sanjeev K. Varma, Syracuse, all of N.Y.

[73] Assignee: New Venture Gear, Inc., Troy, Mich.

[21] Appl. No.: 304,279

[22] Filed: Sep. 12, 1994

[51] Int. Cl.$^6$ ................................................ F16H 48/26
[52] U.S. Cl. ............................... 475/89; 475/74; 475/91; 192/58.41; 180/247; 180/250
[58] Field of Search ............................... 475/74, 89, 91, 475/332; 180/247, 250; 192/58 C

[56] References Cited

U.S. PATENT DOCUMENTS

| | | |
|---|---|---|
| 3,845,671 | 11/1974 | Sharp et al. . |
| 3,848,691 | 11/1974 | Dolan . |
| 4,031,780 | 6/1977 | Dolan et al. . |
| 4,711,136 | 12/1987 | Yoshinaka et al. ............... 180/247 |
| 4,841,803 | 6/1989 | Hamano et al. ................. 180/247 |
| 4,890,509 | 1/1990 | Hara ................................. 475/89 |
| 5,038,182 | 7/1991 | Frost ............................... 475/204 |
| 5,046,998 | 9/1991 | Frost ............................... 475/221 |
| 5,078,660 | 1/1992 | Williams et al. ................ 475/250 |
| 5,090,534 | 2/1992 | Horst ............................... 192/58 C |
| 5,106,351 | 4/1992 | Williams et al. ................ 475/250 |
| 5,148,900 | 9/1992 | Mohan ............................ 192/58 C |
| 5,176,235 | 1/1993 | Williams ......................... 192/58 B |
| 5,203,439 | 4/1993 | Peier ............................... 192/58 C |
| 5,215,160 | 6/1993 | Williams et al. ................ 180/197 |
| 5,232,075 | 8/1993 | Mohan ............................ 192/58 C |
| 5,275,252 | 1/1994 | Sperduti et al. ................. 180/197 |
| 5,275,253 | 1/1994 | Sperduti et al. ................. 180/197 |
| 5,330,030 | 7/1994 | Eastman et al. ................. 180/247 |
| 5,346,044 | 9/1994 | Mohan et al. ................... 192/58 C |
| 5,380,255 | 1/1995 | Brissenden et al. ............. 180/247 |

OTHER PUBLICATIONS

1988 Acustar, Inc. Brochure, New Process Gear Division, Model 249 Electric Shift Full-Time 4WD Transfer Case (pp. 1 and 2).

Primary Examiner—Charles A. Marmor
Assistant Examiner—Sherry Lynn Estremsky
Attorney, Agent, or Firm—Harness, Dickey & Pierce, P. L. C.

[57] ABSTRACT

A transfer case for a four-wheel drive vehicle adapted to provide two- to four-wheel drive on-demand in the high range or four-wheel drive in the low range. The transfer case includes an input shaft coupled to the sun gear of a planetary gear set, a main drive shaft, a first output and a second output. Provided in fixed association with the main drive shaft is a viscous fluid coupling chamber, and associated with the chamber is a drive sprocket. A range clutch sleeve and locking clutch assembly is slidably disposed on the main drive shaft between the planetary gear set and the rotary member for selectively providing two- to four-wheel on-demand high range power, neutral, and four-wheel drive low range power. Inner and outer relatively rotational drum housings surround the aft end of the main drive shaft for defining an annular viscous fluid coupling chamber therebetween. The inner drum is splined to the main drive shaft for rotation with that shaft while the outer drum is fixedly connected with the rotary member for providing torque to the second output.

21 Claims, 5 Drawing Sheets

TRANSFER CASE WITH INTEGRATED VISCOUS COUPLING

BACKGROUND OF THE INVENTION

This invention relates to transfer cases for four-wheel drive systems, and more particularly to a transfer case incorporating a viscous coupling and a gear reduction planetary assembly.

Four-wheel drive systems have been in existence for many decades. The output of the engine has been conventionally split between the front wheels and the rear wheels by a transfer case. One type of system used for many years provided undifferentiated power to all wheels of the vehicle. This gave the vehicle good mobility under adverse surface conditions. However, this type of drive was not particularly useful for normal highway driving in that, because all four wheels operated at the same speed, the vehicle could not be turned without sliding or scuffing one or more tires. This drawback resulted in the development of systems which included a conventional two-wheel drive mechanism. For highway use the two-wheel drive was utilized and this caused the vehicle to assume the characteristics of most other two-wheel drive vehicles.

It is desirable in a four-wheel drive vehicle to obtain the benefits of differentiation provided in conventional two-wheel drive vehicles while also obtaining the benefits of a conventional four-wheel drive, when needed. In these circumstances, transfer cases were developed that were manually actuated to lock out a differential unit when the differentiation was not desired. However, the procedures of manually locking out a differential unit are not practical in that the user must stop the vehicle prior to engaging the all-wheel drive system. Accordingly, efforts have been made to replace the manual lock-out type operation by an automatic locking apparatus. One type of automatically operated apparatus developed utilizes electronic sensing apparatus which senses a difference in rotation speeds of two rotatable speeds of two rotatable parts of the differential. When the difference in speeds exceeds a predetermined value, a solenoid is actuated to operate a mechanical clutching mechanism which couples the two rotatable parts together and renders the differential ineffective.

Another type of automatic apparatus includes a viscous coupling having a plurality of plates connected to one rotatable member and interleaved with a plurality of plates connected to another rotatable member. To this end, viscous couplings have been used in numerous power transmission applications such as four-wheel drive transfer cases, differentials and limited-slip intra-axle and inter-axle devices. In such couplings, viscous fluid substantially fills the housing containing the interleaved plates. As the speed difference between two rotating parts increases, the viscous fluid is sheared by the interleaved elements, which results in a tendency to interlock the rotatable parts. Examples of transfer cases which incorporate a viscous coupling therein are disclosed in U.S. Pat. No. 4,031,780 to Dolan et al., U.S. Pat. No. 5,046,998 to Frost, and in U.S. Pat. No. 5,078,660 to Williams et al., all commonly assigned to the assignee of the instant application.

In the patent to Dolan et al., a transfer case for a four-wheel drive train is disclosed that includes a differential incorporating both a viscous coupling and a viscous fluid operated mechanical clutch which may be operated to inhibit and prevent differentiation.

In the patent to Frost, a transfer case for a four-wheel drive vehicle is disclosed that provides a drive range planetary gear set that is selectively positionable between low and high speed output positions and a neutral position. A dual planetary inter-axle differential gear set is axially spaced from the range planetary gear set. The latter gear set may be positioned to provide either a two-wheel drive mode to a first output or a full-time four-wheel drive mode with differential action between the first output and a second output. A viscous fluid clutch is connected between the first and second outputs for modifying the torque division between these outputs.

Finally, in the patent to Williams et al., a transfer case for full-time four-wheel drive vehicles is disclosed having limited slip between the front and rear drive lines. Like the transfer case of the Frost patent, the transfer case of the Williams et al. patent also includes a drive range planetary gear set that is selectively positionable between low and high drive ranges and a neutral position. A viscous coupling chamber is provided in conjunction with a dual planetary differential gear set for providing full-time four-wheel drive differentiation with limited slip between first and second outputs.

The present invention relates to an transfer case which includes both mechanical and viscous coupling features. The present invention provides a transfer case having operating characteristics and advantages different from those of the prior art.

SUMMARY OF THE INVENTION

It is an object of the present invention to provide a transfer case for on-demand four-wheel drive operation for a four-wheel drive vehicle having an improved coupling arrangement. Two-wheel high range operation to four-wheel high range operation is made possible by incorporation of a viscous coupling uniquely arranged within the transfer case in a compact and simplified manner.

Still another object of this invention is to provide a transfer case of the class described which utilizes a characteristic of viscous fluid of a viscous coupling to direct torque to the front wheel set.

It is another object of the present invention to provide an improved transfer case as set forth above wherein the viscous coupling is arranged in association with a planetary gear set.

A further object of this invention is to provide a transfer case of the type described that may selectively lock out the viscous coupling to provide a positive low drive to the front and rear sets of wheels.

A further object of this invention is to provide a transfer case of the class described which is economical in construction and efficient in operation.

The present invention achieves these objectives in an improved viscous coupling for use in an on-demand four-wheel drive transfer case which functions to automatically provide all-wheel drive when conditions require all-wheel traction. The viscous coupling is operably installed between an input member and its associated planetary gear set and first and second output members of the transfer case and is constructed in a compact arrangement.

The planetary gear set includes a sun gear that is integrally fixed to the output end of the input shaft. An axially movable range clutch sleeve surrounds a main drive shaft and is splined thereto. The sleeve is movable between the three operating positions of the transfer case of the present invention.

In its high range on-demand drive position (two-wheel high range to four-wheel high range), the range clutch sleeve is positioned between internal splines of the sun gear and the main shaft, thus interlocking the two. Rotational movement is delivered to the rear wheels from the first output member and to the inner drum and the inner plates of the viscous coupling assembly associated with the inner drum. A plurality of outer plates are fitted between the inner plates and are fixedly attached to an outer drum, together with front and rear cover plates. These components form a rotatable housing that may be rotated on the inner drum. The inner drum, the outer drum, and the front and rear cover plates together comprise a sealed viscous coupling assembly. The assembly is mostly filled with a viscous fluid.

The front cover plate of the rotatable housing is fixedly attached to a drive sprocket. The drive sprocket has a chain drivingly connected to the front axle via the second output member and a front axle drive shaft.

With power delivered to the inner drum from the vehicle engine, and with the vehicle being driven under normal operating conditions such as on a highway, only a small amount of torque is transmitted through the viscous coupling assembly to the chain drive sprocket because the rotational difference between the inner and outer plates is very small. However, on uneven surfaces that cause the rotation of the inner plates (connected indirectly to the rear wheels) to rotate at a portionally greater rate than the outer plates (connected indirectly to the front wheels), a relatively large torque is delivered to the front wheels due to the viscous shear resistance of the viscous fluid between the interleaved clutch plates.

Upon the range clutch sleeve being shifted rearwardly from its high range position to its neutral position, the sleeve becomes disengaged from the planetary gear set, thus no power at all is delivered to the main drive shaft.

The low range four-wheel drive mode is engaged when the range clutch sleeve is shifted rearwardly to its aft-most position, pushing with it an axially-movable locking clutch. The sleeve interlocks the planet pinion carrier and the main drive shaft, thus reducing rotational speed of the main drive compared with that of the input shaft. The locking clutch is also splined to the main drive shaft and includes external splines that are engaged with internal splines defined in a counterbore of the differential gear. This arrangement "locks out" the viscous coupling assembly by providing a direct, locked connection between the planet pinion carrier and the differential gear, in turn directly driving the front wheels.

Other objects and advantages will be made apparent as the description progresses.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
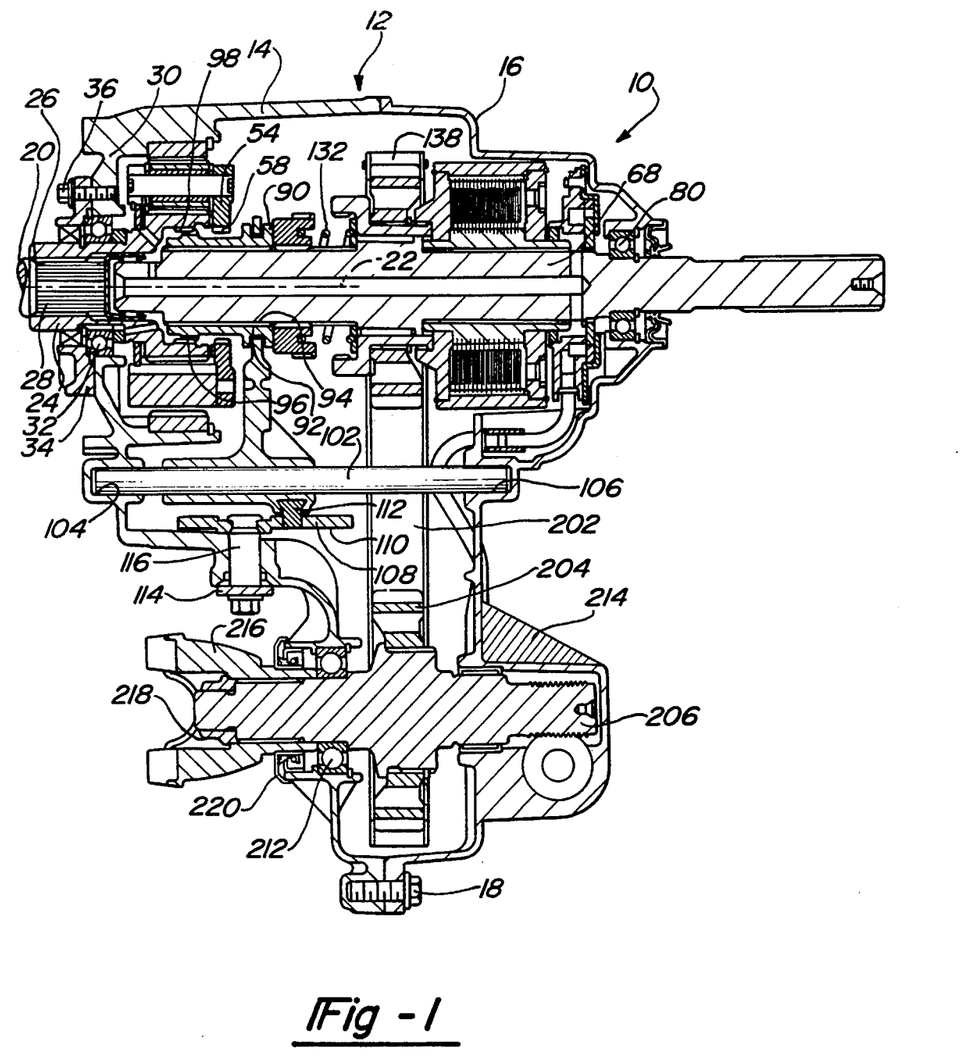
FIG. 1 is a sectional view of an exemplary four-wheel drive transfer case incorporating an integrated viscous coupling constructed in accordance with the preferred embodiment of the present invention.

In general, the present invention discloses a novel viscous coupling drivingly attached to a gear reduction planetary assembly. Referring to the drawings, there is shown in FIG. 1 a portion of an exemplary transfer case 10 for use in four-wheel drive motor vehicles according to the present invention incorporating a helical planetary gear reduction assembly 40. Vehicle transfer case 10 and helical planetary gear reduction assembly 40 are thoroughly disclosed in U.S. Pat. No. 4,677,873 to Eastman, commonly assigned to the assignee of the instant application, the disclosure of which is incorporated by reference herein. In general, the transfer case 10 is adapted for conventional interconnection to a drive train (engine and transmission) for driving front and rear ground wheels supported on front and rear axles, respectively.

The transfer case 10 includes a housing assembly 12 formed by front and rear housing sections 14 and 16, respectively, which are suitably connected by a plurality of threaded bolts, only one of which is shown at 18. The front housing section 14 is adapted to receive a vehicle transmission output shaft 20 for rotation about a longitudinal axis 22. An input stub shaft 24, aligned on longitudinal axis 22, has its internal splines 26 engaged with external splines 28 of transmission output shaft 20. The stub shaft 24 is shown rotatably supported in a hub portion 30 of the front housing section 14 by a ball bearing assembly 32 and sealingly enclosed by a collar member 34 secured by bolts 36.

Figure 2:
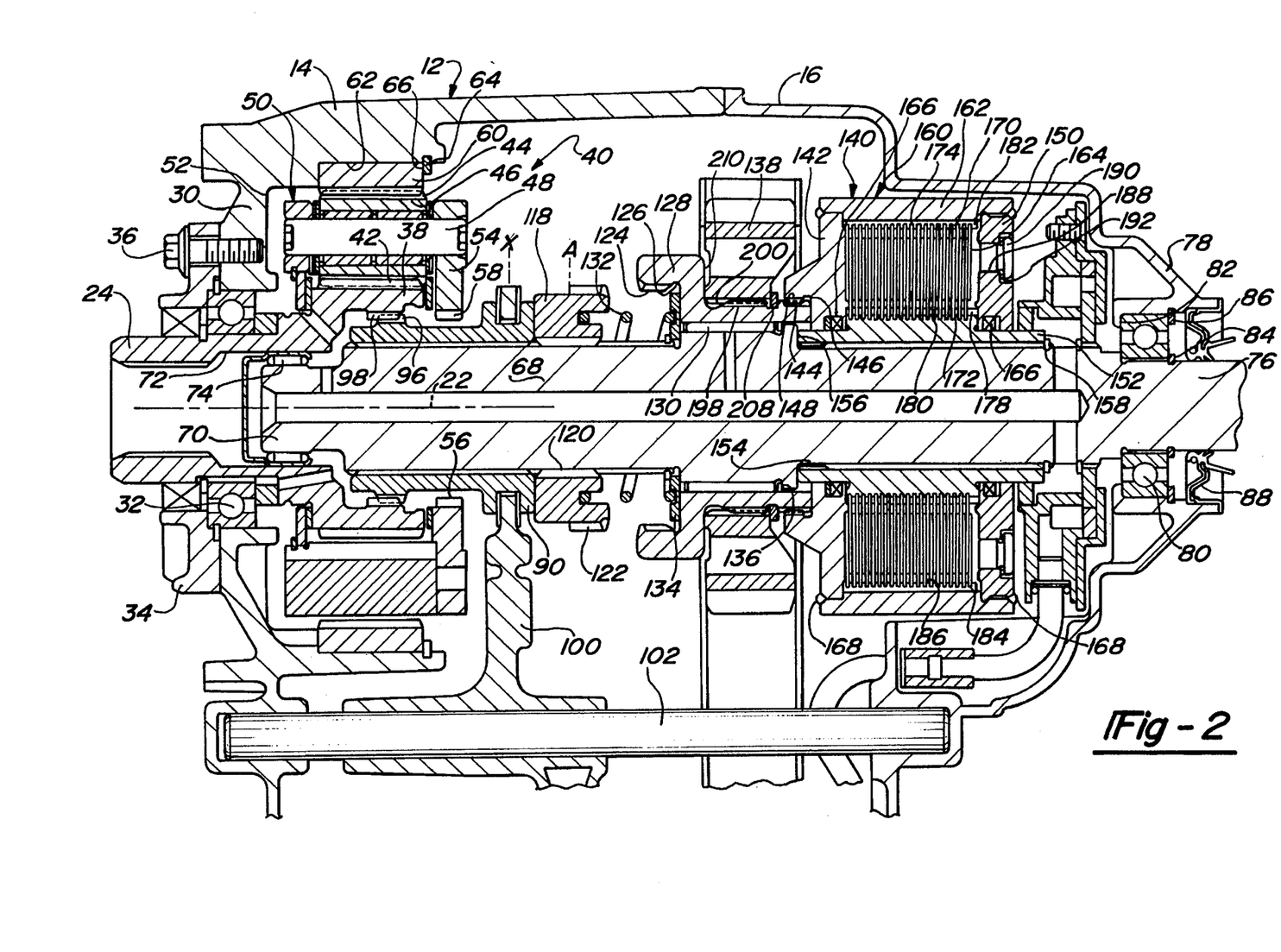
FIG. 2 is an enlarged fragmentary view of FIG. 1 showing the integrated viscous coupling in an on-demand two-wheel high range to four-wheel high range drive mode.

With reference to FIG. 2, the input stub shaft 24 has an input sun gear 38 operatively associated with a helical planetary gear set reduction assembly 40. More specifically, the sun gear 38 is formed integrally with the inner end of the stub shaft 24. A helical planetary gear set reduction assembly 40 is a speed reduction apparatus operable for preferably defining high, low and neutral range positions as will be described hereinafter. It will be appreciated that the planetary gear set reduction assembly 40 is merely exemplary of a suitable two-speed reduction apparatus for use in the on-demand transfer case 10 of the present invention.

As noted, the sun gear 38 is formed integrally with the inner end of stub shaft 24. Helical teeth 42 of the sun gear 38 are meshed with teeth 44 of a plurality of planet pinion gears, one of which is shown at 46. Each planet pinion gear 46 is rotatably journalled on a pin 48 supported in a planetary gear set carrier 50. The planetary gear set carrier 50 includes fore and aft carrier ring members 52 and 54, suitably interconnected as by machine bolts (not shown). It will be noted that the aft carrier member 54 is formed with a central bore 56 having internal splines 58 concentrically arranged about the longitudinal axis 22. The planet pinion gears 46 mesh with a helical annulus gear 60 suitably mounted in a splined, press-fit manner to an inner annulus surface 62 formed in the front housing section 14. The annulus gear 60 is also retained against rearward movement by a snap ring 64 received in an internal annular notch 66.

Figure 3:
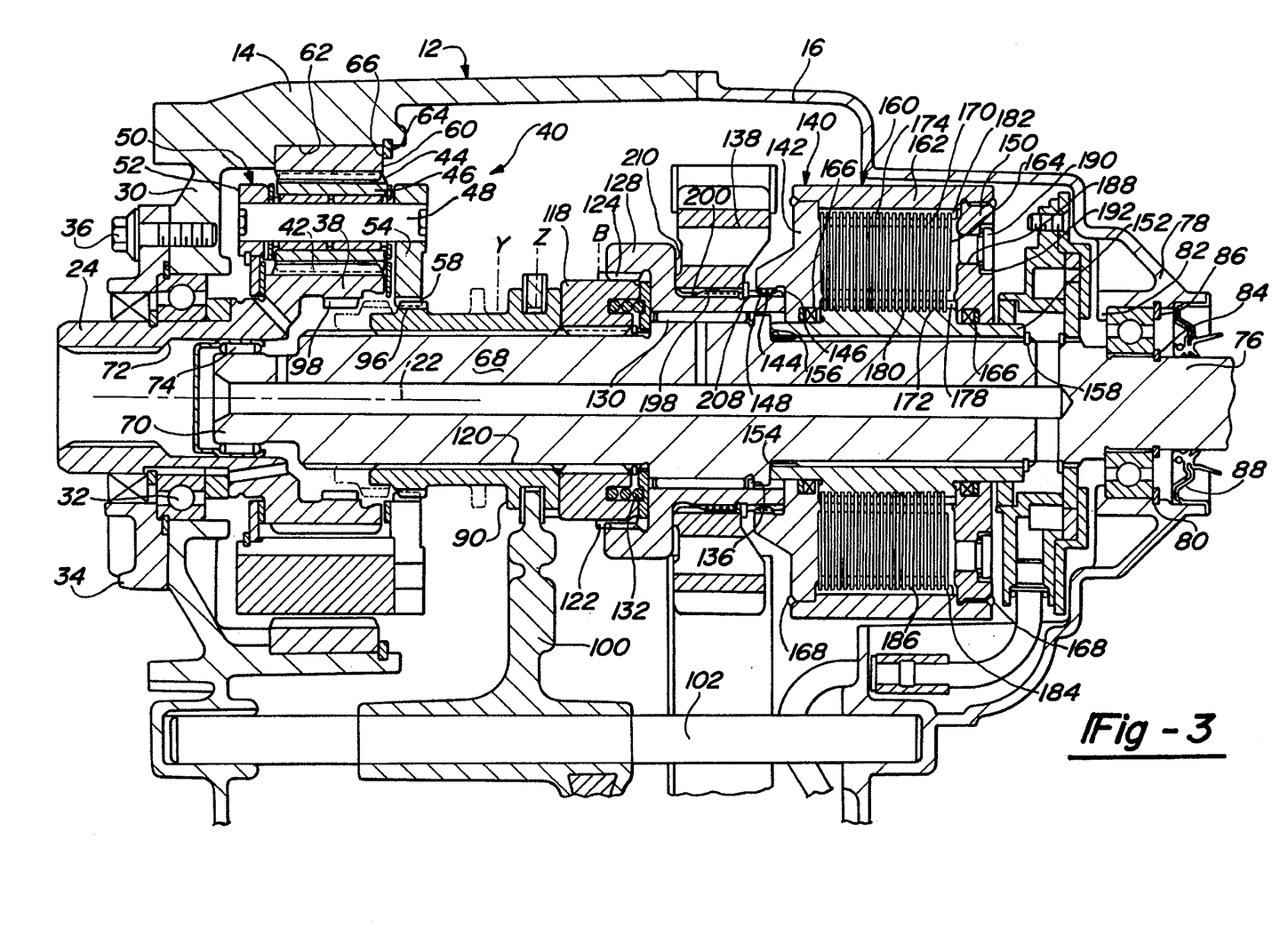
FIG. 3 is an enlarged fragmentary view of FIG. 1 showing the integrated viscous coupling in a four-wheel low range mode.

With reference to FIGS. 2 and 3, a first or main drive shaft 68, aligned concentrically with longitudinal axis 22, has a pilot end portion 70 journally supported in an input shaft axial counterbore 72 by roller bearings 74 and an output end portion 76 journally supported in a hub portion 78 of the rear housing section 16 by a ball bearing assembly 80. Forward movement of the ball bearing assembly 80 is prevented by an annular wall 82 defined in the hub portion 78. Aftward movement of the assembly 80 is checked by inner and outer bearing retainer rings 84 and 86, respectively. A rear oil seal 88 sealingly encloses the bearing assembly 80 and provides a seal about the output end portion 76 of the drive shaft 68 to prevent leakage of lubricating oil.

The main drive shaft 68 is concentrically surrounded by a range clutch sleeve 90 axially slidable thereon by means of collar internal splines 92 engaged with external splines 94 formed on the drive shaft 68. The range clutch sleeve 90 is formed with external splines 96 and, in its "X" position illustrated in FIG. 2, is shown slidably engaged with sun gear internal splines 98 concentrically arranged about the longitudinal axis 22 of the main drive shaft 68 and provided in an axial counterbore in the right or aft end of the input stub shaft 24. Torque or power flow is transferred directly from the input stub shaft 24 through engagement of the splines 96 and 98 in conjunction with the engagement of the collar internal splines 92 and the output shaft external splines 94, thereby establishing the direct high range position.

With reference to FIG. 3, the aft carrier internal splines 58 are placed in sliding meshed engagement with the external splines 96 upon the range clutch sleeve 90 being slid rearwardly to position "Z" for defining the "low" drive range of the transfer case 10. It will be noted that when the range clutch sleeve 90 is moved rearwardly a predetermined distance from its high range position ("X" of FIG. 2), its external splines 96 are disengaged both from the sun gear internal splines 98 and the aft carrier internal splines 58 for defining a "neutral" drive range position indicated by position "Y". With the transfer case 10 shifted in neutral, rotation of the input stub shaft 24 drives only the planet pinion gears 46 and the fore and aft carrier ring members 52 and 54, respectively, around the annulus gear 60. Thus, in the neutral position no torque is transmitted to the drive shaft 68, and thus no power is transmitted to the vehicle's wheels (not shown).

As will be appreciated, the range clutch sleeve 90 is selectively shiftable through coaxial movement of a range fork 100. The fork 100 is axially movable on a shift rail 102. The rail 102 is fixed between a front support 104 defined in the front housing section 14 and a rear support 106 defined in the rear housing section 16. Axial movement of the fork 100 is controlled by a sector assembly 108 comprising a sector plate 110 connected to the fork 100 by a range pin 112. The sector assembly 108 further includes an operating lever 114 operably connected to the plate 110 by a sector shaft 116. It is to be understood that the range fork 100 can be selectively shifted by the vehicle operator through the sector assembly 108 between the two-wheel to four-wheel on-demand mode and full-time four-wheel mode either manually (i.e., via a shift lever) or electrically (i.e., via a motor driven system).

The main drive shaft 68 is also concentrically surrounded by a locking clutch 118 axially slidable thereon by means of hub internal splines 120 engaged with the external splines 94 formed on the drive shaft 68. The locking clutch 118 is formed with external clutch splines 122. The external clutch splines 122 are placed in sliding meshed engagement with internal splines 124 defined in a counterbore 126 of a differential gear 128. The differential gear 128 concentrically surrounds the main drive shaft 68. While engagement of the differential gear 128 is discussed below, when not engaged, the differential gear 128 is allowed to freely rotate on the shaft 68, rotatably supported by a plurality of needle bearings 130. A biasing element 132 encourages the locking clutch 118 away from the differential gear 128 and assures that the range clutch sleeve 90 remains in its "X" position (or high position) when not selectively engaged in either its "Y" position (or neutral position; see FIG. 3) or its "Z" position (or low position; also of FIG. 3). The biasing element 132 is preferably a coil spring that concentrically surrounds the drive shaft 68 and is positioned between the locking clutch 118 and a locking clutch washer 134. The washer 134 is biased against the differential gear 128. A snap ring 136 limits aftward movement of the differential gear 128. A drive sprocket 138 is fixedly splined to the differential gear 128 in a conventional manner for rotation therewith.

A viscous coupling assembly, generally indicated as 140, includes a front cover plate 142 that is fixedly coupled to the differential gear 128. Fixed coupling is provided by internal splines 144 defined in the counterbore 146. The internal splines 144 are in constant meshed engagement with external splines 148 formed on the aft end of the differential gear 128. The coupling assembly 140 further includes a rear cover plate 150 that defines an annular ring. An inner drum 152 is shown to concentrically surround the drive shaft 68 and is adapted to be fixedly engaged with the drive shaft 68 so as to rotate therewith. More specifically, the inner drum 152 is coupled for rotation with the main drive shaft 68 through a series of splines 154 interiorly formed thereon. Forward movement of the inner drum 152 along the shaft is prohibited by a radial annual shoulder 156 defined on the drive shaft 68, while aftward movement is checked by an inner retaining ring 158.

A rotatable drum housing assembly 160 encircles the inner drum 152 and generally includes a cylindrical outer drum 162 which is fixedly connected to the front cover plate 142 and the rear cover plate 150. So constructed, the drum housing assembly 160 and the inner drum 152 are capable of rotating relative to one another.

The drum housing assembly 160 encloses the inner drum 152 with the inner surfaces of outer drum 162 and front and rear cover plates 142 and 150, respectively, defining an internal chamber 164.

The chamber 164 is hermetically sealed around the inner drum 152 by fore and aft seals 166 and fore and aft back-up rings 168. Disposed within the chamber 164 are two sets of interleaved viscous coupling plates, cumulatively designated as 170, which substantially fill the chamber 164. One set of plates, hereinafter referred to as inner plates 172, are mounted for rotation with the inner drum 152 while the second set of plates, hereinafter referred to as outer plates 174, are mounted for rotation with the outer drum 162.

Figure 4:
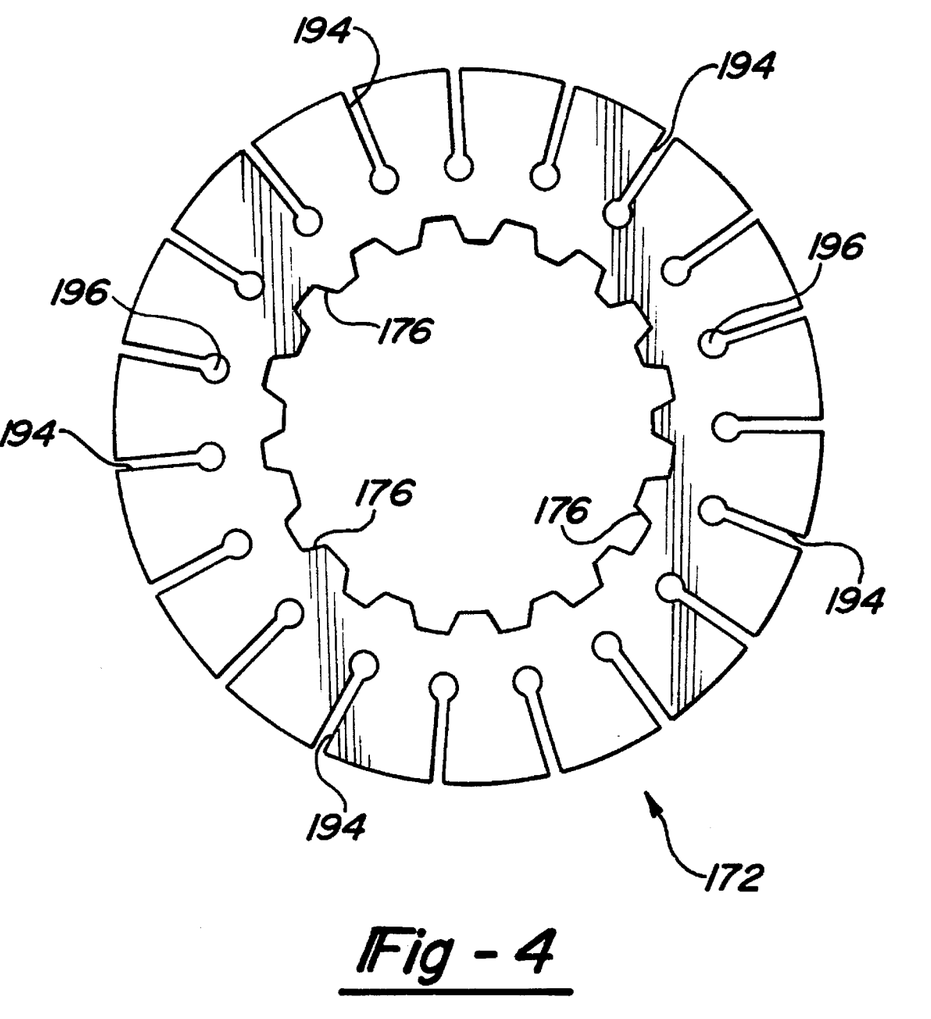
FIG. 4 is a plan view of one of the viscous coupling plates utilized in the viscous coupling assembly of FIGS. 1–3.

In general, the viscous coupling plates 170 are formed from relatively thin plate stock and are generally ring shaped. As shown in FIG. 4, each of the inner plates 172 includes splines 176 formed along its inner circumference which are configured to meshingly engage axial splines 178 formed on the exterior surface of the inner drum 152. The inner plates 172 are positioned in a spaced relationship and are so maintained by spacer rings 180.

The outer plates 174 are mounted to the outer drum 162 via external splines 182 formed around the outer circumference of outer plates 174. In particular, the splines 182 meshingly engage axial splines 184 formed interiorly of the outer drum 162.

In the exemplary viscous coupling apparatus shown, the spacer rings 180 are not used with the outer plates 174 and thus allow axial movement of the outer plates 174 between the adjacent inner plates 172 along the splines 184. However, in an alternative embodiment, the outer plates 174 may be axially spaced by the spacer rings 186 and fixed relative to the outer drum 162 while the inner plates 172 are axially movable therebetween along the inner drum 152.

The chamber 164 is substantially filled, typically ninety percent or greater, with a viscous fluid such as silicone oil, the remaining volume of chamber 164 being filled with air or some other inert gas. To facilitate filling of the chamber 164, the rear cover plate 150 is provided with a fill port 188 and a fill plug 190. An O-ring seal 192 is provided to prevent the escape of fluid between the wall of the fill port 188 and the fill plug 190.

During operation of the viscous coupling assembly 140 (this presumes that the range clutch sleeve 90 is in its "X" or on-demand high range position), the main drive shaft 68 will be driven by the vehicle's source of power of transmission via the helical planetary gear set reduction assembly 40 to cause the inner drum 152 and its associated inner plates 172 to rotate.

Generally, the drum housing assembly 160 and its associated outer plates 174 move as a unit and will be rotating under substantially similar conditions (that is, the vehicle is traveling on dry pavement with the drum housing assembly 160 rotating with the front wheels while the inner drum 152 is rotating with the rear wheels). Where the conditions involve a slight differential in rotational speeds between the inner drum 152 and the drum housing assembly 160, the fluid will permit viscous shearing and accommodate the rotational difference by allowing slip. However, as the rotational speed differential and viscous shearing rate increase, the apparent viscosity of the fluid will decrease which results in a softening is more than offset by the increase in shear torque generated by the increase in speed and, as the viscous shearing rate increase, the viscous coupling assembly 140 becomes increasingly rigid thereby transmitting an increased amount of torque.

If a substantially continuous speed differential is maintained over a period of time, the temperature within the chamber 164 will begin to increase causing the viscous fluid to expand. Since the fluid will naturally expand at a rate greater than that of the chamber 164, the internal pressure of the chamber 164 will rise. During the rise in chamber pressure, the gas or air contained within the chamber 164 dissolves into the silicone oil. This change in the distribution of air acts to modify its flow patterns and will allow for the development of pressure differentials.

In response to the pressure differentials, each of the axially movable plates (that is, the outer plates 174 in the illustrated embodiment) will axially shift and establish frictional contact with an adjacent non-movable plate (that is, the inner plate 172). With the establishment of frictional contact between the inner and outer plates 172 and 174, respectively, a sudden and sharp increase in transmitted torque occurs without a corresponding increase in different rotational speed. This is referred to as the "humping" phenomenon or torque progression, and is well illustrated by line A of FIG. 5 in which a diagram illustrating torque (expressed in newton-meters [Nm] on the Y-axis) versus revolutions per minute (on the X-axis) as shown.

Figure 5:
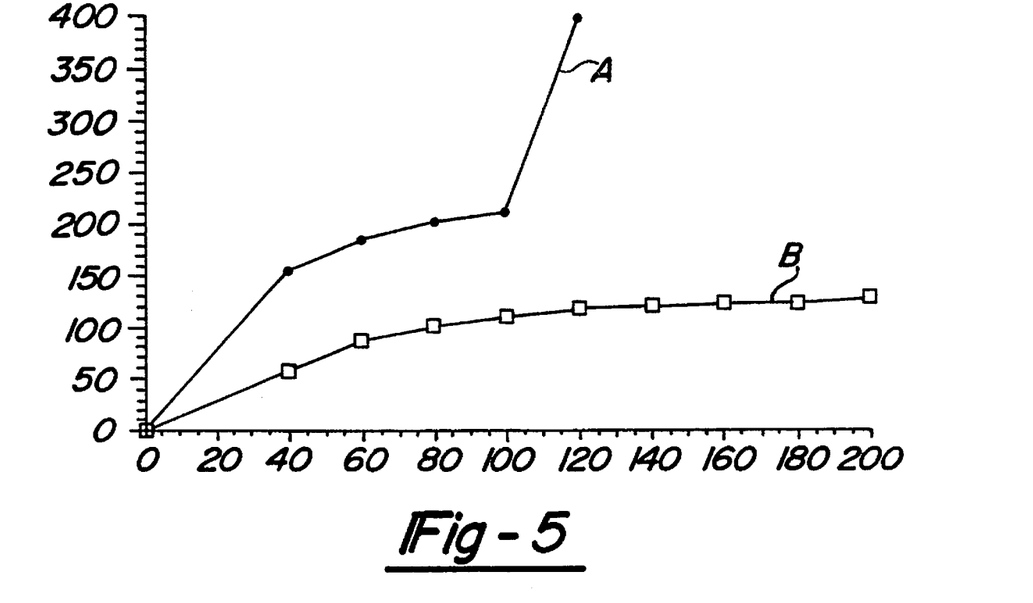
FIG. 5 is a graph illustrating the amount of torque delivered through the transfer case of the present invention to the front wheels as a function of engine speed.

As may be seen on the graph, the torque increases according to a predictable slope relative to the engine speed until frictional contact between the inner and outer plates 172 and 174, respectively, is established, at which time a dramatic increase in torque occurs. (Line A represents experimental data derived from a working embodiment of the present invention in which the viscous coupling assembly 140 contained twenty-four pairs of plates with 60,000 cSt silicone in which the chamber 164 was ninety percent filled. Conversely, line B was derived from data developed from a working embodiment incorporating twenty-seven pairs of plates with 10,000 cSt silicone and a chamber 164 being eighty-eight percent filled. As may be clearly seen, no torque progression occurred in the latter embodiment.)

As is known, and with reference back to FIG. 4, the axial movement of the outer plates 174 relative to the outer drum 162 is promoted by radially extending slits 194 and other openings 196 being provided in the plate 172 to facilitate the development of the pressure differentials.

When frictional contact is developed between the inner plates 172 and the outer plates 174, the front cover plate 142 rotates in the direction of the main drive shaft 68 because the differential gear 128 is in constant mesh with the front cover plate 142. The differential gear 128 has external splines 198 which engage the internal splines 200 of the drive sprocket 138. Thus, the differential gear 128 carries the drive sprocket 138 for rotation therewith. A chain 202 driven by the drive sprocket 138, in turn, rotates a driven sprocket 204 which drives a front or second drive shaft 206. The drive sprocket 138 is fixed on the differential gear 128 between a snap ring 208 and a radial annual shoulder 210 formed on the differential gear 128.

The second drive shaft 206 is supported and retained in the transfer case 10 by a front bearing assembly 212 supported in the front housing section 14 and a rear bearing assembly 214 located in the rear housing section 16. A second drive shaft yoke 216 is secured to the forward end of the second drive shaft 206 with a yoke nut 218 with the second drive shaft yoke 216 being sealed by an oil seal 220. The second drive shaft yoke 216 extends forwardly and is adapted for connecting to a drive shaft to drive the front axle of a vehicle.

Figure 6:
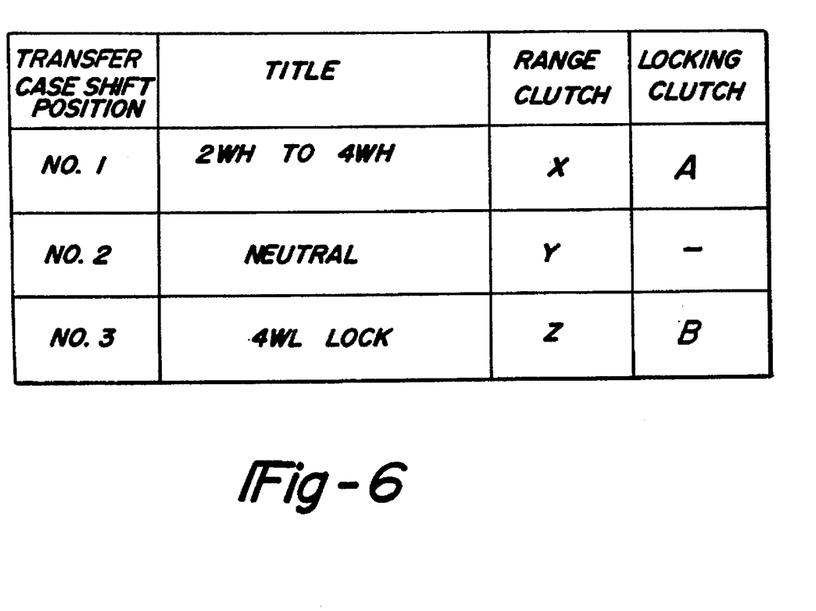
FIG. 6 is a chart depicting the three operating states which may be selected by the vehicle operator upon selective movement of the range clutch sleeve.

With reference to the three shift positions designated in FIG. 6, operation of the transfer case 10 will now be described in fuller detail. Operating state No. 1 is the "2WH TO 4WH" on-demand drive mode wherein the range clutch sleeve 90 is located in the leftward "X" position with the locking clutch 118 biased to the leftward "A" position. As noted, torque or power flow is transferred from the sun gear 38 to the main drive shaft 68 via the range clutch sleeve 90. This high range torque drive is then transferred to the inner drum 152 of the viscous coupling assembly 140 and directly to the rear wheels (not shown). When the rotational speed of the inner plates 172 (splined to the inner drum 152) is more or less the same as the rotational speed of the outer plates 174 (splined to the outer drum 162) as would be the case on smooth, even surfaces, no shearing of the viscous fluid takes place, thus no torque is transferred to the front wheels, thus the vehicle remains in its conventional two-wheel drive mode.

However, in the event the vehicle overpasses uneven terrain or a loose surface, the difference between the rotational speeds of the inner (driving) and outer (driven) plates becomes increasingly acute, and the viscous fluid is sheared by the interleaved plates which results in their tendency to become interlocked. As a result, the front cover plate 70 of the drum housing assembly 160 turns the drive sprocket 138 through the interconnection of the splines 144 and 148.

Rotation of the drive sprocket 138 drives the chain 202 which, in turn, drives the vehicle's front wheels via the second drive shaft 206. Thus, in the No. 1 operating state shown in FIG. 6, the sun gear internal splines 98 of the sun gear 38 provides torque to the rear wheels while the viscous coupling assembly 140 allows for torque to be directed to the front wheels as needed for traction.

Upon transfer case 10 being placed in its No. 2 "NEUTRAL" operating state (with the range clutch sleeve 90 moved rightwardly to the "Y" position and the locking clutch 118 still in its unengaged position), the sun gear internal splines 98 are disengaged from the range clutch external splines 96 whereby no input power is transferred from the input stub shaft 24 to the clutch sleeve 90 and thus no output torque is delivered to either first or second drive shafts 68 and 206, respectively. In the neutral state, the viscous coupling assembly 140 permits front and rear axle differentiation when the vehicle is being towed.

Operating state No. 3 is the "4WL LOCK" drive mode wherein the range clutch sleeve 90 is shifted rightwardly from its high-range "X" position past its neutral position "Y" to its low-range position "Z" and the locking clutch 118 is forcibly shifted rightwardly to its viscous coupling assembly 140 "lock-out" position "B" against the biasing force of the biasing element 132. With the locking clutch 118 in its "B" position, its internal splines 120 engage the splines 92 of the main drive shaft 68 and its external clutch splines 122 engage the internal splines 124 of the differential gear 128 thereby "locking out" the viscous coupling assembly 140. Thus, power flow from the input stub shaft 24 passes through the planetary gear set carrier 50 at a reduced speed and into the range clutch sleeve 90 for delivery without differentiation to both the rear wheels via the main drive shaft 68 and the front wheels via the second drive shaft 206. The second drive shaft 206 is positively rotated by the drive chain 202 at the same speed as the main drive shaft 68, and there is no inter-axle differentiation. Furthermore, because the viscous coupling assembly 140 is locked out, there is no viscous coupling involvement in the low-range.

While the specific embodiment of the invention has been shown and described in detail to illustrate the principles of the present invention, it will be understood that the invention may be embodied otherwise without departing from such principles. For example, one skilled in the art will readily recognize from such discussion and from the accompanying drawings and claims as various changes, modifications and variations can be made therein without departing from the spirit and scope of the invention as defined in the following claims.

What is claimed is:

1. A vehicle transfer case having an input shaft adapted to be rotatably driven about a central axis and first and second outputs operatively driven by said input shaft for rotatively driving first and second axles, respectively, the transfer case comprising:

a transfer case housing, said input shaft rotatably supported within said housing along said central axis;

a speed reduction gear set, said speed reduction gear set including an input sun gear, said input sun gear being operatively connected to said input shaft to rotate therewith at a first rotational speed, said input sun gear having a plurality of internal splines concentrically arranged about said central axis, said speed reduction gear set being operatively connected to and rotatively driven by said input sun gear, said speed reduction gear set further including an output planet pinion carrier, said output planet pinion carrier being operatively connected to said input shaft to rotate therewith at a second rotational speed, said second rotational speed being less than said first rotational speed, said output planet pinion carrier having a plurality of internal splines concentrically arranged about said central axis;

a central shaft rotatably supported within said housing along said central axis, said central shaft having its front end disposed adjacent an aft end of said input shaft and having its aft end constituting said first output of said transfer case, said central shaft formed with concentrically-surrounding external splines;

a rotary member coaxially disposed relative to said central shaft such that said central shaft and said rotary member are rotatable with respect to each other, said rotary member being operatively connected with said second output, said rotary member having a plurality of internal splines concentrically arranged about said central shaft;

a clutch assembly, said clutch assembly comprising a range clutch sleeve and a locking clutch, said range clutch sleeve concentrically surrounding said central shaft, said range clutch sleeve having internal splines slidably engaging said central shaft external splines and said range clutch sleeve having external splines to selectively drivingly connect said internal splines of said sun gear or said internal splines of said planet pinion carrier to said central shaft, said locking clutch concentrically surrounding said central shaft, said locking clutch having internal splines slidably engaging said central shaft external splines and said locking clutch having external splines to selectively drivingly connect said internal splines of said rotary member to said central shaft, said locking clutch being provided adjacent said range clutch sleeve, said clutch assembly being axially movable between a first position and a second position;

return means interposed between said clutch assembly and said rotary member for operatively biasing said clutch assembly toward its first position;

means for shifting said clutch assembly between said first position wherein said internal splines of said input sun gear operatively engage said external splines of said range clutch sleeve and said second position wherein said internal splines of said planet pinion carrier operatively engage said external splines of said range clutch sleeve and said external splines of said locking clutch operatively engage said internal splines of said rotary member; and a viscous coupling chamber defined by an outer drum assembly operatively connected to said rotary member and an inner drum assembly fixably secured to said central shaft, said outer drum assembly including an outer drum housing and front and rear annular end cover plates fixably secured thereto, said chamber including first and second sets of viscous clutch plates disposed therein, said first set of viscous clutch plates being coupled to said outer drum housing for rotation with said rotary member and said second set of viscous clutch plates being coupled to said inner drum housing for rotation with said central shaft, said sets of first and second viscous clutch plates being alternately interleaved such that outermost plates of said first clutch plates are adjacent each of said end plate covers, said chamber further including a viscous fluid, said viscous fluid in said chamber being adapted to be sheared when said first and second viscous plates are rotated relative to one another, said fluid transmitting torque from said central shaft to said rotary member and increasing in temperature as a result of shearing action, said fluid expanding as its temperature increases and when said locking clutch is in said second position, said viscous coupling is selectively locked out to shut out relative rotation between said first and second plates.

2. The vehicle transfer case of claim 1 wherein said viscous coupling chamber further includes a plurality of annular spacer rings each of which is interposed between adjacent plates of said first set of viscous clutch plates for longitudinally positioning each of said plates of said first set of viscous clutch plates so as to define a predetermined spacing therebetween.

3. The vehicle transfer case of claim 1 wherein said viscous coupling chamber further includes a plurality of annular spacer rings each of which is interposed between adjacent plates of said second set of viscous clutch plates for longitudinally positioning each of said plates of said second set of viscous clutch plates so as to define a predetermined spacing therebetween.

4. The vehicle transfer case of claim 1 wherein said rotary member comprises a differential gear and a first sprocket, said first sprocket being operatively attached to said differential gear, said differential gear having a counterbore, said internal splines being provided in said counterbore.

5. The vehicle transfer case of claim 4 further including a chain for driving or being driven by said first sprocket for driving or being driven by a second sprocket connected to said second output.

6. The vehicle transfer case of claim 1 further including a shift fork assembly for selectively shifting said clutch assembly between said first and second positions, said shift fork assembly including a range fork, said range fork being operatively connected to said range clutch sleeve.

7. The vehicle transfer case of claim 1 wherein said clutch assembly is axially movable to a third position, said third position disengaging said external splines of said range clutch sleeve from said internal splines of said input sun gear and from said internal splines of said planet pinion carrier and further disengaging said external splines of said locking clutch from said internal splines of said rotary member.

8. The vehicle transfer case of claim 1 wherein movement of said clutch assembly to said second position locks said rotary member to said central shaft in an operative condition in which no differentiation is provided between said first and second outputs.

9. The vehicle transfer case of claim 1 wherein said return means is a coil spring concentrically surrounding said central shaft and having a first end acting on said rotary member and a second end acting on said locking clutch.

10. In a power transfer apparatus adapted for driving a four-wheel drive motor vehicle having front and rear ground engaging wheels, said power transfer apparatus comprising:

a housing;

an input shaft rotatably driven by a drive train of the motor vehicle for delivering drive torque to said power transfer apparatus;

a first shaft supported for rotation in said housing for driving connection to one of the front and rear ground engaging wheels, said first shaft being formed with concentrically-surrounding external splines;

a second shaft supported for rotation in said housing for driving connection to the other of the front and rear ground engaging wheels;

a rotary member coaxially disposed relative to said first shaft such that said first shaft and said rotary member are rotatable with respect to each other, said rotary member being operatively connected with said second shaft;

a clutch assembly concentrically surrounding said first shaft, said clutch assembly having internal splines slidably engaging said external splines of said first shaft, said clutch assembly being selectively and axially movable between a first position, a second position, and a third position;

a viscous coupling chamber defined by an outer drum assembly operatively connected to said rotary member and an inner drum assembly fixably secured to said first shaft, said outer drum assembly including an outer drum housing and front and rear annular end cover plates fixably secured thereto, said chamber including first and second sets of viscous clutch plates disposed therein, said first set of viscous clutch plates being coupled to said outer drum housing for rotation with said rotary member and said second set of viscous clutch plates being coupled to said inner drum housing for rotation with said central shaft, said sets of first and second viscous clutch plates being alternately interleaved such that outermost plates of said first clutch plates are adjacent each of said end plate covers, said chamber further inducing a viscous fluid, said viscous fluid in said chamber being adapted to be sheared when said first and second viscous plates are rotated relative to one another, said fluid transmitting torque from said first shaft to said rotary member and increasing in temperature as a result of shearing action, said fluid expanding as its temperature increases and when said locking clutch is in said second position, said viscous coupling is selectively locked out to shut out relative rotation between said first and second plates; and gear reduction means being rotatively driven by an input sun gear formed with said input shaft and having a first position operating range engaged when said clutch assembly is in said first position, said first position operating range directly driving said first shaft via said clutch assembly with no speed reduction, said first position operating range additionally providing on-demand drive through said viscous coupling to said second shaft in response to the resistance of said viscous fluid in said viscous coupling chamber, a second position operating range engaged when said clutch assembly is in said second position, said second position operating range driving said first shaft with a speed reduction to provide direct, undifferentiated drive to said front and rear ground engaging wheels, and a third position operating range engaged when said clutch assembly is in said third position wherein no driving torque is transferred from said input shaft to either said first shaft or said rotary member via said clutch assembly.

11. The power transfer apparatus of claim 10 wherein said input sun gear of said gear reduction means includes a plurality of internal splines concentrically arranged about said first shaft, said gear reduction means further including an output planet pinion carrier, said output planet pinion carrier being operatively connected to said input shaft, said output planet pinion carrier having a plurality of internal splines concentrically arranged about said first shaft.

12. The power transfer apparatus of claim 11 wherein said clutch assembly includes a range clutch sleeve concentrically surrounding said first shaft, said range clutch sleeve having internal splines slidably engaging said external splines of said first shaft and having external splines for selective driving engagement with said internal splines of said sun gear or with said internal splines of said output planet pinion carrier.

13. The power transfer apparatus of claim 12 wherein said rotary member includes a plurality of internal concentric splines, said plurality of concentric splines being concentric with said first shaft.

14. The power transfer apparatus of claim 13 wherein said clutch assembly further includes a locking clutch concentrically surrounding said first shaft, said locking clutch having internal splines slidably engaging said external splines of said first shaft and having external splines for selective driving engagement with said plurality of internal concentric splines of said rotary member, said locking clutch being positioned adjacent said range clutch sleeve.

15. In a power transfer apparatus adapted for driving a four-wheel drive motor vehicle having front and rear ground engaging wheels, said power transfer apparatus comprising:

a housing;

an input shaft rotatably driven by a drive train of the motor vehicle for delivering drive torque to said power transfer apparatus;

a first shaft supported for rotation in said housing for driving connection to one of the front and rear ground engaging wheels;

a second shaft supported for rotation in said housing for driving connection to the other of the front and rear ground engaging wheels;

a planetary differential gear set operatively connected to said input shaft, said planetary differential gear set including a first rotational output having a first rotational speed and a second rotational output having a second rotational speed, said second rotational speed being less than said first rotational speed;

a rotary member coaxially disposed relative to said first shaft such that said first shaft and said rotary member are rotatable with respect to each other, said rotary member being operatively connected with said second shaft;

a viscous coupling chamber defined by an outer drum assembly operatively connected to said rotary member and an inner drum assembly fixably secured to said first shaft, said outer drum assembly including an outer drum housing and front and rear annular end cover plates fixably secured thereto, said chamber including first and second sets of viscous clutch plates disposed therein, said first set of viscous clutch plates being coupled to said outer drum housing for rotation with said rotary member and said second set of viscous clutch plates being coupled to said inner drum housing for rotation with said first shaft, said first and second sets of viscous clutch plates being alternately interleaved such that outermost plates of said first set of viscous clutch plates are adjacent each of said end plate covers, said chamber further inducing a viscous fluid disposed within said fluid chamber, said viscous fluid in said chamber being adapted to be sheared when said first and second sets of viscous plates are rotated relative to one another, said fluid transmitting torque from said first shaft to said rotary member and increasing in temperature as a result of shearing action, said fluid expanding as its temperature increases and when said locking clutch is in said second position, said viscous coupling is selectively locked out to shut out relative rotation between said first and second plates;

means for locking said second rotational output to both said first shaft and said rotary member for direct, nondifferentiated drive to said front and rear ground engaging wheels and for engaging said first rotational output to said first shaft such that said first shaft is directly driven and said second shaft is driven part-time in response to the resistance of said viscous fluid in said viscous coupling chamber.

16. The power transfer apparatus of claim 15 wherein said first rotational output includes a first plurality of concentric splines and said second rotational output includes a second plurality of concentric splines, said first and second plurality of concentric splines being concentric with said first shaft.

17. The power transfer apparatus of claim 16 wherein said first shaft is formed with concentrically-surrounding external splines and wherein said means for locking comprises a clutch assembly, said clutch assembly including a range clutch sleeve concentrically surrounding said first shaft, said range clutch sleeve having internal splines slidably engaging said external splines of said first shaft and having external splines for selective driving engagement with said first plurality of concentric splines or with said second plurality of concentric splines.

18. The power transfer apparatus of claim 17 wherein said rotary member includes a third plurality of concentric splines, said third plurality of concentric splines being concentric with said first shaft.

19. The power transfer apparatus of claim 18 wherein said clutch assembly further includes a locking clutch concentrically surrounding said first shaft, said locking clutch having internal splines slidably engaging said external splines of said first shaft and having external splines for selective driving engagement with said third plurality of concentric splines, said locking clutch being positioned adjacent said range clutch sleeve.

20. The power transfer apparatus of claim 19 further including return means interposed between said clutch assembly and said rotary member for operatively biasing said clutch assembly toward engagement of said external splines of said range clutch sleeve with said first plurality of concentric splines.

21. The power transfer apparatus of claim 20 wherein said return means is a coil spring concentrically surrounding said first shaft and having a first end acting on said rotary member and a second end acting on said locking clutch.

* * * * *